United States Patent [19]

Lo et al.

[11] 3,906,466

[45] Sept. 16, 1975

[54] PROPAGATION CIRCUIT FOR CROSS-TIE WALL MEMORY SYSTEM

[75] Inventors: David S. Lo, Burnsville; Maynard C. Paul, Bloomington, both of Minn.

[73] Assignee: Sperry Rand Corporation, New York, N.Y.

[22] Filed: Aug. 9, 1974

[21] Appl. No.: 495,971

[52] U.S. Cl. .................. 340/174 TF; 340/174 BC; 340/174 SR

[51] Int. Cl.$^2$ .................. G11C 11/15; G11C 19/08

[58] Field of Search... 340/174 TF, 174 BC, 174 SR

[56] References Cited

UNITED STATES PATENTS 3,868,659 2/1975 Schwee ........................ 340/174 TF

OTHER PUBLICATIONS

IEEE Transactions on Magnetics; Mag. 8, No. 3, September, 1972, pp. 405–407.

*Primary Examiner*—James W. Moffitt

*Attorney, Agent, or Firm*—Kenneth T. Grace; Thomas J. Nikolai; Marshall M. Truex

[57] ABSTRACT

A conductive drive line configuration for propagating binary information in a cross-tie wall memory system is disclosed. The drive line includes serially-intercoupled portions, each of which defines a memory cell, that are overlaid and uniformly spaced along a cross-tie wall in a ferromagnetic layer. Each portion includes two separate segments, a transfer segment and a memory segment, that overlay keepers of high magnetic remanence. The keepers provide permanent localized fields, at their ends, that are normal to the plane of the layer while the current energized sections provide pulsed localized fields, normal to their edges, that, in the plane of the layer, are antiparallel to each other and normal to the cross-tie wall. The keepers' localized fields are utilized to stabilize the position of an inverted Néel wall section (which inverted Néel wall section is bounded by a cross-tie on one end and a Bloch-line on the other end) of the cross-tie wall during transfer of an inverted Néel wall section from memory cell to memory cell serially along the cross-tie wall.

1 Claim, 7 Drawing Figures

CROSS-TIE BLOCH-LINE PAIR DATA PROPAGATION

PROPAGATION CIRCUIT FOR CROSS-TIE WALL MEMORY SYSTEM

BACKGROUND OF THE INVENTION

The propagation of inverted Néel wall sections instead of magnetic bubbles in a serial access memory system was first proposed by L. J. Schwee in the publication "Proposal on Cross-Tie Wall and Bloch Line Propagation in Thin Magnetic Films" IEEE Transactions on Magnetics, MAG 8, No. 3, pp. 405–407, September, 1972. Such a memory system utilizes ferromagnetic films of 80% Ni - 20% Fe of between 100 and 300 angstroms (A) thick in which cross-tie walls can be changed to Néel walls and Néel walls can be changed to cross-tie walls by applying appropriate fields. Associated with the cross-tie wall is a section of inverted Néel wall that is bounded by a cross-tie on one end and a Bloch-line on the other end. In such a cross-tie wall memory system, information is entered at one end of the serial access memory system by the generation of an inverted Néel wall section that is representative of a binary 1 and a non-inverted Néel wall section that is representative of a binary 0, and is moved or propagated along the cross-tie wall by the successive generation (and then the annihilation) of inverted Néel wall sections at successive memory cells along the cross-tie wall. In a Naval Ordnance Laboratory report NOLTR 73-185, L. J. Schwee has published more recent results of his further development of the cross-tie wall memory. The present invention is considered to be an improvement to the cross-tie wall memory as proposed by L. J. Schwee in such publications.

SUMMARY OF THE INVENTION

In the cross-tie wall memory system of the present invention there is provided a conductive drive line that is comprised of a plurality of serially-intercoupled portions that are uniformly spaced along a cross-tie wall in a ferromagnetic layer. Each portion of the drive line defines a memory cell within the ferromagnetic layer and includes two separate segments intercoupled in a manner such that when they are current energized they couple localized fields, normal to their edges, that in the plane of the layer are normal to the cross-tie wall but antiparallel to each other. Further, the two segments overlay associated keepers of high magnetic remanence that provide localized fields, at their ends, that are normal to the plane of the layer. The localized fields of the keepers are utilized to stabilize the position of an inverted Néel wall section (which inverted Néel wall section is bounded by a cross-tie on one end and a Bloch-Line on the other end) of the cross-tie wall during transfer of an inverted Néel wall section from memory cell to memory cell along the cross-tie wall.

The first segment of the drive line that is encountered by the propagating inverted Néel wall section is a transfer segment into which the inverted Néel wall section is transferred by generating a new inverted Néel wall section at the transfer segment and shortly thereafter annihilating the inverted Néel wall section in the previous memory cell. In a like manner, the new inverted Néel wall section is then transferred to the memory segment by generating a new inverted Néel wall section at the memory segment and shortly thereafter annihilating the inverted Néel wall section in the transfer segment. Thus, in a manner similar to the prior art referenced above, the propagation of binary data, in which an inverted Néel wall section represents a binary 1, from memory cell to memory cell includes two similar cycles of transfer and store. Here the opposite or antiparallel fields of the current energized transfer and memory segments and the fields provided by the keepers stabilize the positioning of the inverted Néel wall sections and thus permit a more reliable transfer of data along the cross-tie wall.

DESCRIPTION OF THE PREFERRED EMBODIMENT

Figure 1:
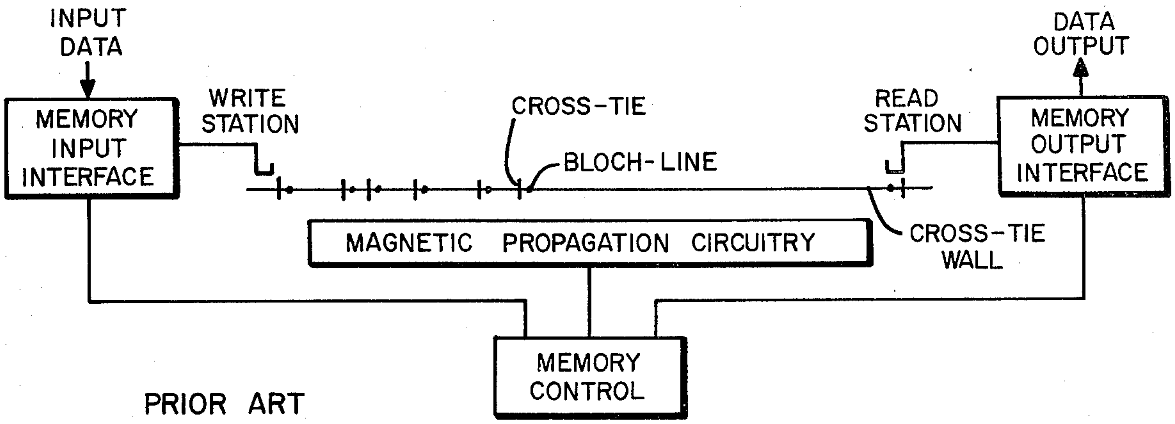
FIG. 1 is a block diagram of a prior art cross-tie wall memory system.
Figure 2:
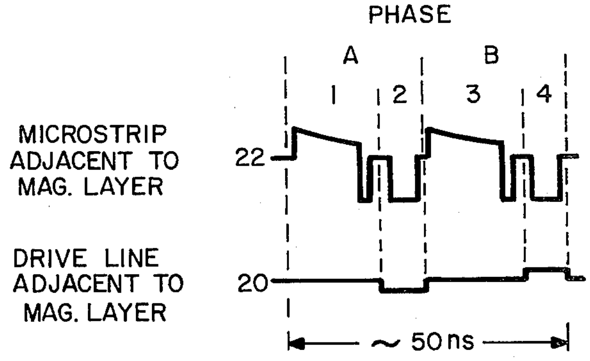
PRIOR ART Fig. 2
FIG. 2 is an illustration of the prior art wave forms of the signals utilized to propagate the inverted Néel wall sections along the cross-tie wall in the cross-tie wall memory system of FIG. 1.

With particular reference to FIG. 1 there is presented a block diagram of the prior art cross-tie wall memory system proposed by L. J. Schwee in the above referenced publications. FIG. 2 is an illustration of a prior art wave forms of the signals utilized to propagate the inverted Néel wall sections along the cross-tie wall in the cross-tie wall memory system of FIG. 1.

In the prior art operation of a cross-tie wall memory system, as exemplified by FIGS. 1, 2, the propagation cycle utilizes two successive phases: phase A(1, 2) and phase B(3, 4). With an inverted Néel wall section written into the write station at the start of propagation cycle 1, the phase A1 signal generates a new inverted Néel wall section at memory cell 1 that is immediately forwarded of the inverted Néel wall section at the write station. Next, the phase A2 signals annihilate the inverted Néel wall section at the write station. Next, the phase B3 signal generates a new inverted Néel wall section within memory cell 1 but forward of the inverted Néel wall section generated during phase A1. Lastly, the phase B4 signals annihilate the inverted Néel wall section in memory cell 1 that was generated during phase A2 leaving in memory cell 1 only the inverted Néel wall section that was generated during phase B3. At this time (at the tend of propagation cycle 1), the inverted Néel wall section that is representative of a binary 1 that was initially at the write station has been transferred into memory cell 1. If during the next propagation cycle 2, when the inverted Néel wall section (1) in memory cell 1 is to be transferred into memory cell 2, an inverted Néel wall section (1) is to be simultaneously transferred into memory cell 1 from the write station, an inverted Néel wall section (1) must be written into the write station prior to the next subsequent propagation cycle 2 phase A1, otherwise a non-inverted Néel wall section, representative of a binary 0, would be transferred into memory cell 1. This propagation cycle sequence is as disclosed in the above L. J. Schwee publications cited hereinabove.

Figure 3:
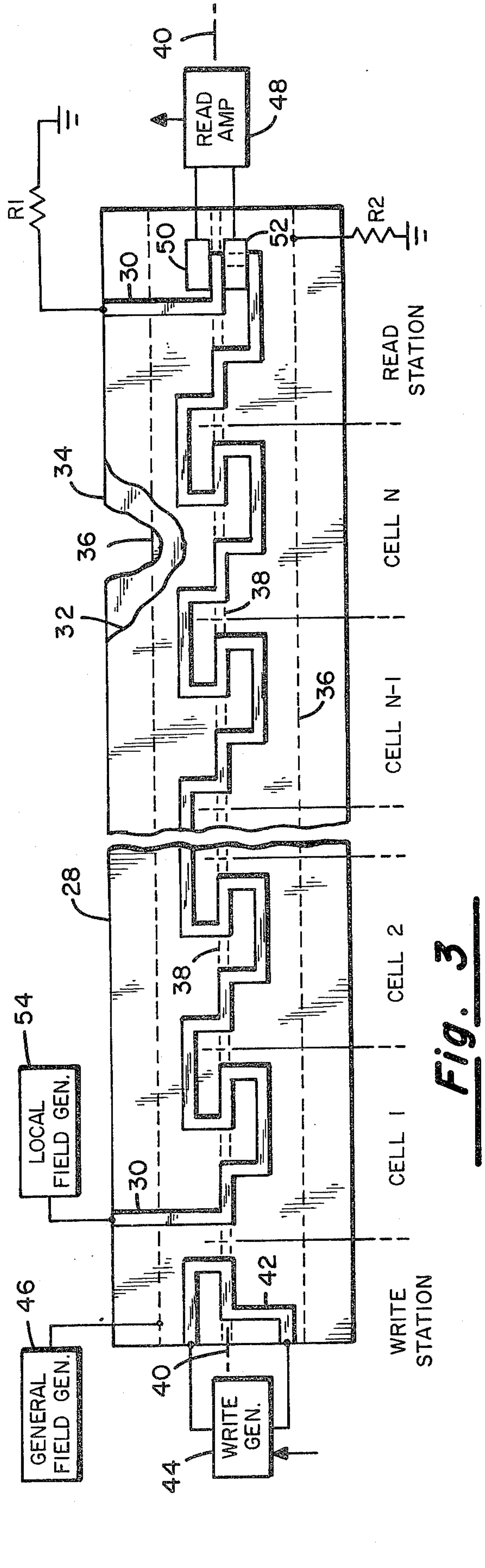
FIG. 3 is an illustration of a cross-tie wall memory system incorporating the present invention.

With particular reference to FIG. 3 there is presented an illustration of the cross-tie wall memory system of the present invention which invention is particularly directed toward memory plane 28. This memory system, except for the novel configuration of the drive line 30 that is above the magnetic layer 32, may be considered to be similar to that configuration taught by the hereinabove referenced publications of L. J. Schwee. In this configuration there is illustrated a non-magnetizable, e.g., glass, substrate member 34 having a copper microstrip 36 affixed to its bottom side and a thin ferromagnetic layer 32 affixed to its top side. Affixed to the top side of layer 32 and superposed the microstrip 36 is the copper drive line 30 which is affixed to and superposed the magnetic layer 32, but separated therefrom by an insulative, e.g., Si 0 or Mylar, member 31. Drive line 30 consists of a plurality of serially-intercoupled portions, each of which defines a memory cell 1 - N, that are overlaid and uniformly spaced along a cross-tie wall 38 oriented along a longitudinal axis 40. Along the lefthand edge of memory plane 28 and superposed the top surface of layer 32 and member 31 is a write drive line 42 driven by write generator 44. At the same end is general field generator 46 for coupling wave form 22 of FIG. 2 to microstrip 36. At the opposite end of cross-tie wall 38 at the read station there is provided a read amplifier 48 and its associated pick-up elements 50, 52 for reading out the binary significance of the information generated by write generator 44 and serially propagated along cross-tie wall 38 by the serially-intercoupled portions of drive line 30. Additionally provided is local field generator 54, coupled to the lefthand end of drive line 30, for coupling wave form 20 of FIG. 2 to drive line 30.

Figure 5:
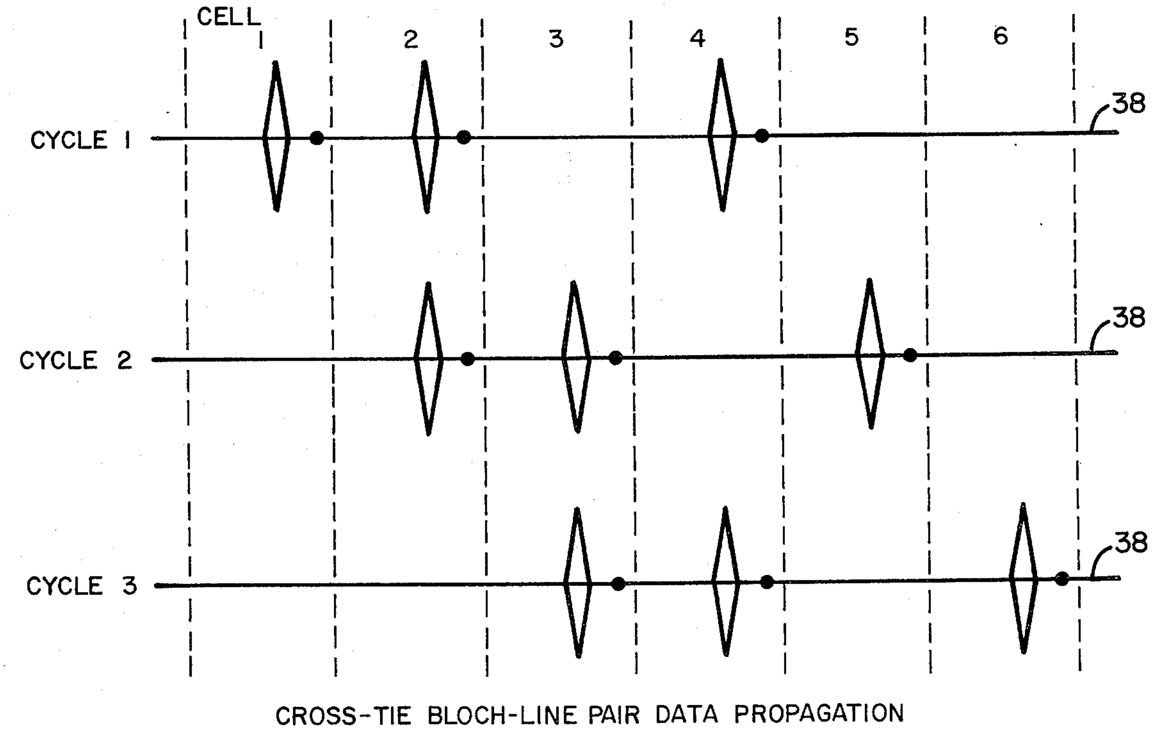
FIG. 5 is an illustration of the manner in which the binary word of FIG. 4 is propagated through the cross-tie wall memory system of FIG. 3 at successive cycle times.
Figure 4:
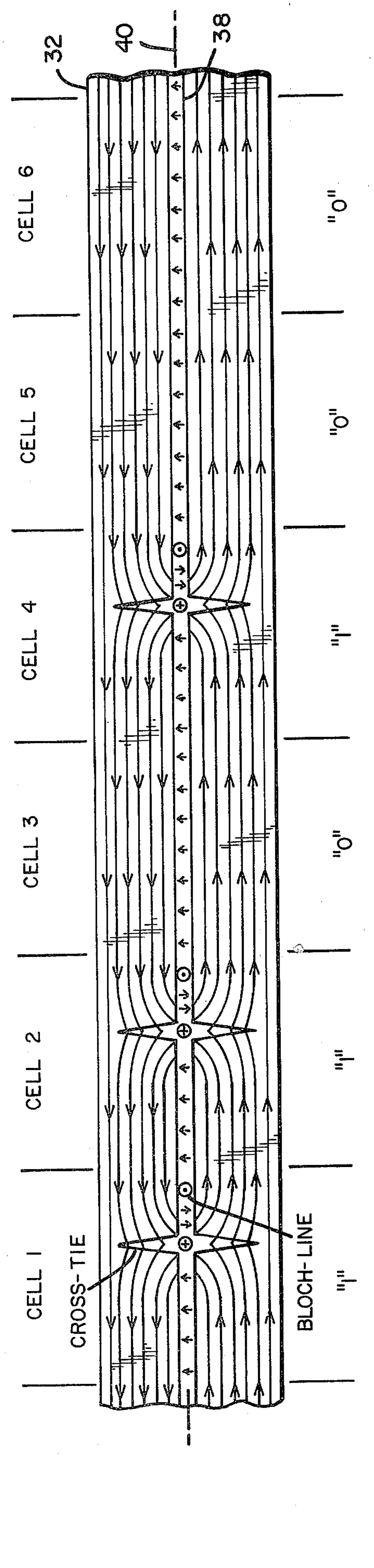
FIG. 4 is an illustration of a cross-tie wall in which is stored the binary word 110100, each binary 1 being represented by an inverted Néel wall section bounded by a cross-tie Bloch-line pair.

With particular reference to FIG. 4 there is provided an illustration of a cross-tie wall in which is stored the binary word 110100, each binary 1 being represented by an inverted Néel wall section bounded by a cross-tie Bloch-line pair. Using FIG. 5 as an illustrative example there is provided an illustration of the manner in which the binary word of FIG. 4 is propagated through the cross-tie wall memory system of FIG. 3 at successive cycle times 1, 2, 3, . . . T. Using the prior art wave forms of FIG. 2 as a typical example of the wave forms utilized to propagate the cross-tie Bloch-line pairs, representative of a binary 1, along cross-tie wall 38 it can be seen that at each successive cycle time all cross-tie Bloch-line pairs are entered into cross-tie wall 38 from the left and simultaneously shifted along cross-tie wall 38 in a manner of a serial shift register to be emitted from the righthand end, such as for example, at read station of FIG. 3.

Figure 6:
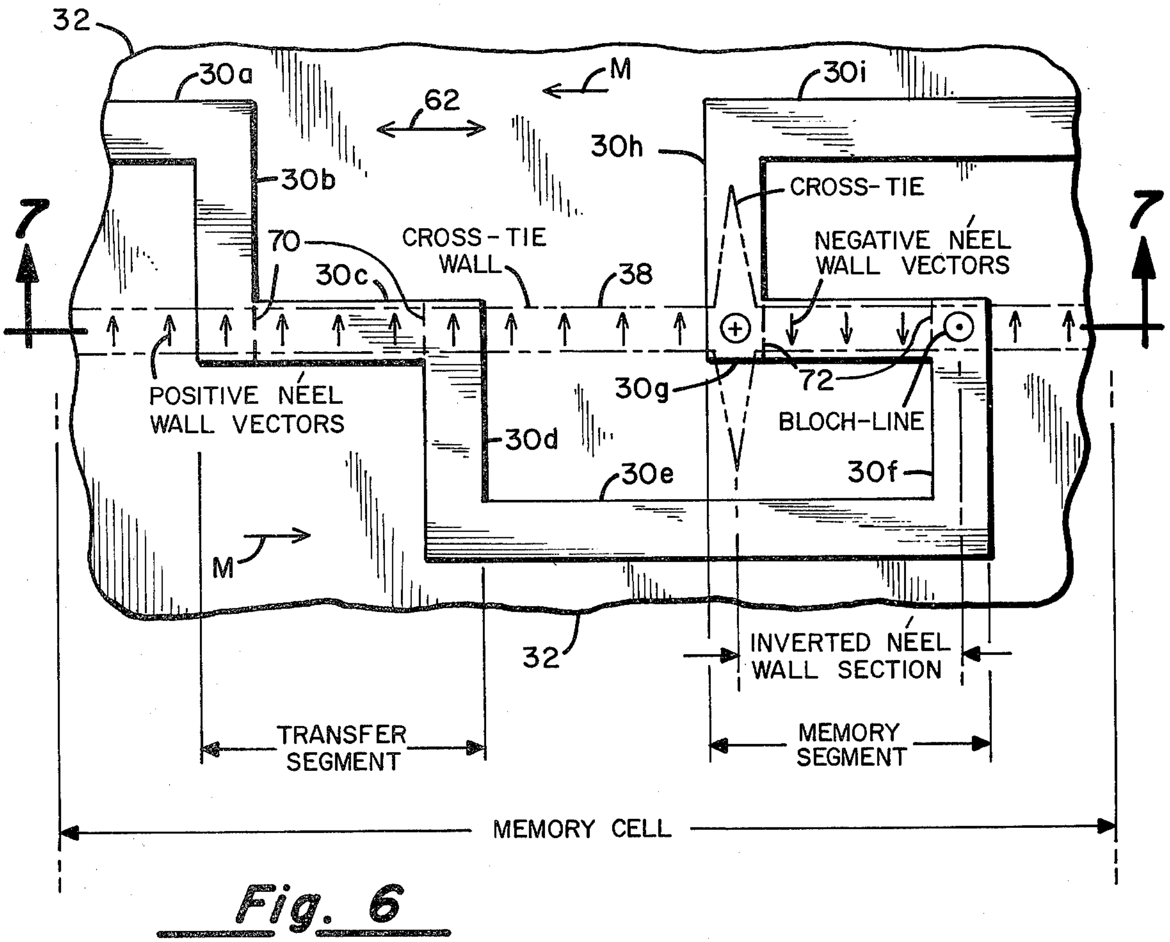
FIG. 6 is a plan view of one memory cell of FIG. 3 in which is stored an inverted Néel wall section bounded by a cross-tie on one end and a Bloch-line on the other end which inverted Néel wall section is representative of the storage of a binary 1.

With particular reference to FIG. 6 there is presented a plan view of one memory cell of memory plane 28 of FIG. 3. In the illustrated memory cell there is stored in the memory segment thereof an inverted Neel wall section bounded by a cross-tie on one end and a Bloch-line on the other end representative of the storage of a binary 1. Such inverted Néel wall section is represented by the negative Néel wall vectors pointed in a downwardly direction while the remaining portion, i.e., the non-inverted Neel wall section, of the cross-tie wall is represented by the positive Néel wall vectors pointed in an upwardly direction. If such representative memory cell were to be redrawn for the purpose of illustrating the storage of a binary 0, the cross-tie Bloch-line pair illustrated in the memory segment would be deleted with the cross-tie wall being represented by a continuation of the positive Néel wall vectors throughout the transfer segment and the memory segment.

Figure 7:
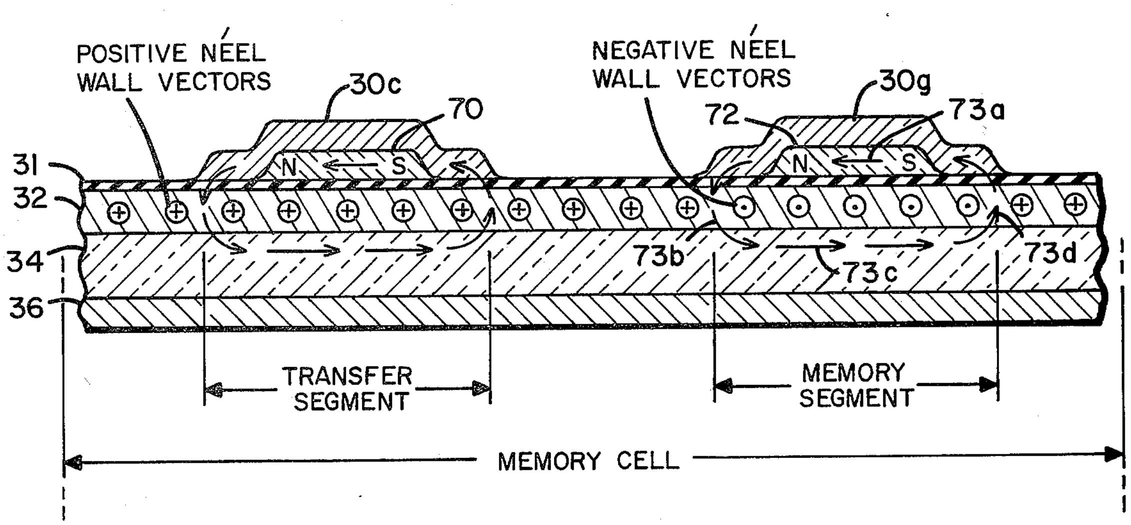
FIG. 7 is an illustration of a cross section of the memory plane FIG. 6 taken along line 6—6 thereof illustrating the stacked, superposed elements of FIG. 6 and the magnetic vector representations therein.

With particular reference to FIG. 7 there is presented an illustration of a cross section of the memory cell of FIG. 6 taken along line 6—6 thereof for the purpose of illustrating the stacked, superposed elements of FIG. 6 and the magnetic vector representations thereof. FIGS. 6, 7 illustrate that drive line 30, in the areas of the illustrated memory cell, is comprised of a plurality of straight drive line segments 30*a* – 30*a* which straight drive line segments are intercoupled in a manner such that a positive current signal coupled to straight drive line segment 30*a* generates, in the area of straight drive line segment 30*c*, a localized field normal to its edges and in the plane of layer 32 having an upwardly directed vector orientation while such current flowing through straight drive line segment 30*g* generates a localized field normal to its edges in the plane of layer 32 that is oriented in a downwardly directed vector orientation. Thus, it is apparent that when a current signal is coupled to drive line 30 the localized fields in the areas of straight drive line segments 30 *c* and 30*g* are both in the plane of layer 32 but are oriented antiparallel each other and normal to cross-tie wall 38 which is also oriented parallel to the uniaxial anisotropy of layer 32 represented by the easy axis 62. Note the orientation of the magnetization M of layer 32 above and below the cross-tie wall 38 as denoted by the vectors M. These oppositely directed fields provided by drive line 30 in the area of cross-tie wall 38 within the transfer segment and the memory segment of a single memory cell provide the necessary mechanism whereby the wave forms 20, 22 of FIG. 2 permit the propagation of the binary information in cross-tie wall 38, as represented by a cross-tie Bloch-line pair representative of a 1 or no cross-tie Bloch-line pair representative of a binary 0, successively through the memory cells of the cross-tie wall memory system of FIG. 3 all as schematically illustrated by the timing diagram of FIG. 5.

With reference to FIG. 7 the purpose of keepers 70, 72, illustrated as being sandwiched between the straight drive line segments 30*c*, 30*g* and layer 32, is illustrated by the counterclockwise vectors flowing into the S pole and out of the N pole of keeper 72 as localized fields represented by vectors 73*a* – 73*d*, vector 73*b* also being representative of the magnetization in the cross-tie and vector 73*d* being representative of the magnetization in the Bloch-line that bound the inverted Néel wall section along straight drive line segment 30*g*. These localized fields 73*b* and 73*d* at the N end and at the S end of keeper 72 are normal to the plane of layer 32 and are configured to coincide with the positions of the associated cross-tie Bloch-line pairs as they are propagated along cross-tie wall 38 and are temporarily, during their propagation down cross-tie wall 38, situated under the keepers 70 and 72 such that such cross-tie Bloch-line pairs are stabilized in position by the localized fields at the respective ends of the keepers 70 and 72. These localized fields provided by the keepers 70 and 72 ensure the reliable propagation of the inverted Néel wall sections as they travel down cross-tie wall 38 from cell 1 through cell N of the cross-tie wall memory system of FIG. 3.

What is claimed is:

1. In a cross-tie memory system in which binary data are stored as inverted Néel wall sections, which inverted Neel wall sections are bounded by a cross-tie on one end and by a Bloch-line on the other end, of a cross-tie wall in a ferromagnetic layer and in which said binary data are serially propagated along said cross-tie wall by the interacting fields provided by a microstrip and a superposed drive line sandwiching said magnetic layer therebetween, the improvement in which said drive line is constructed of a plurality of serially-intercoupled portions that are uniformly spaced along said cross-tie wall, each of which portions defines a memory cell in the associated area of said magnetic layer and along said cross-tie wall, each of said portions comprising:

a transfer segment and a memory segment aligned along said cross-tie wall intercoupled for providing, when current energized, respectively associated localized fields in the plane of said magnetic layer, which fields are anti-parallel to each other and normal to said cross-tie wall;

keepers of high magnetic remanence associated with said transfer segment and said memory segment for providing localized fields, at their ends, that are normal to the plane of said magnetic layer and that stabilize the positions of the cross-tie and the Bloch-line of an inverted Néel wall section at the respective ends of said keepers that are associated with said transfer segment and said memory segment.

* * * * *

UNITED STATES PATENT OFFICE
CERTIFICATE OF CORRECTION

PATENT NO. : 3 906,466

DATED : September 16, 1975

INVENTOR(S) : David S. Lo and Maynard C. Paul

It is certified that error appears in the above-identified patent and that said Letters Patent are hereby corrected as shown below:

IN THE PRINTED PATENT:

Claim 1, Column 6, Line 5, after "wall" insert

-- and --.

Signed and Sealed this

*second* Day of *December 1975*

[SEAL]

*Attest:*

RUTH C. MASON
*Attesting Officer*

C. MARSHALL DANN
*Commissioner of Patents and Trademarks*